United States Patent
Abou Mahmoud et al.

(10) Patent No.: US 10,594,646 B2
(45) Date of Patent: *Mar. 17, 2020

(54) PRIORITIZING MESSAGES IN AN ACTIVITY STREAM WITH AN ACTIONABLE ITEM OR EVENT FOR THE USER TO RESPOND

(71) Applicant: International Business Machines Corporation, Armonk, NY (US)

(72) Inventors: Alaa Abou Mahmoud, Dracut, MA (US); Paul R. Bastide, Boxford, MA (US); Matthew E. Broomhall, Goffstown, NH (US); Robert E. Loredo, North Miami Beach, FL (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/255,362

(22) Filed: Jan. 23, 2019

(65) Prior Publication Data

US 2019/0158450 A1 May 23, 2019

Related U.S. Application Data

(63) Continuation of application No. 14/719,726, filed on May 22, 2015, now Pat. No. 10,257,149.

(51) Int. Cl.
```
G06F 15/16    (2006.01)
H04L 12/58    (2006.01)
H04L 29/08    (2006.01)
```
(52) U.S. Cl.
CPC .............. *H04L 51/26* (2013.01); *H04L 51/32* (2013.01); *H04L 67/306* (2013.01); *H04L 51/12* (2013.01); *H04L 67/22* (2013.01)

(58) Field of Classification Search
CPC .......... H04L 51/26; H04L 51/32; H04M 3/42; H04M 3/5307; G06Q 10/107; G06Q 10/10; G06F 3/0482

See application file for complete search history.

(56) References Cited

U.S. PATENT DOCUMENTS 6,499,021 B1    12/2002   Abu-Hakima
6,778,642 B1 *   8/2004   Schmidt, Jr. ........ H04M 3/5307
                                                              379/67.1

(Continued)

OTHER PUBLICATIONS

List of IBM Patents or Patent Applications Treated as Related, Jan. 23, 2019, pp. 1-2.

(Continued)

*Primary Examiner* — Dustin Nguyen
(74) *Attorney, Agent, or Firm* — Robert A. Voigt, Jr.; Winstead PC

(57) ABSTRACT

A method, system and computer program product for handling an overwhelming amount of messages in an activity stream. Messages in an activity stream, such as an activity stream of a social networking system, of a user are monitored. Those monitored messages that contain an actionable item or event are identified. The messages that contain an actionable item or event are prioritized in a list based on one or more of the following factors: the deadline, the relationship of the sender of the message to the user, the user's desired social relationship with the sender of the message and the event schedule. The prioritized list is then displayed to the user. In this manner, the user will be able to handle the overwhelming amount of messages in an activity stream by determining which posts with an actionable item or event to respond prior to other posts in the user's activity stream.

20 Claims, 3 Drawing Sheets

(56) References Cited

U.S. PATENT DOCUMENTS

| | | | |
|---|---|---|---|
| 7,844,668 B2 | 11/2010 | Canning et al. | |
| 8,095,613 B1 | 1/2012 | Perkowitz et al. | |
| 8,805,937 B2 | 8/2014 | Bendel et al. | |
| 8,818,985 B2 | 8/2014 | Fischer et al. | |
| 9,483,529 B1* | 11/2016 | Pasoi | H04L 51/32 |
| 9,614,807 B2 | 4/2017 | Spivack et al. | |
| 9,641,989 B1 | 5/2017 | Dietrich et al. | |
| 2002/0120702 A1 | 8/2002 | Schiavone et al. | |
| 2003/0097361 A1 | 5/2003 | Huang et al. | |
| 2004/0143636 A1 | 7/2004 | Horvitz et al. | |
| 2005/0055412 A1 | 3/2005 | Kaminsky et al. | |
| 2005/0240655 A1 | 10/2005 | Lipton et al. | |
| 2006/0010217 A1 | 1/2006 | Sood | |
| 2006/0168059 A1* | 7/2006 | Chang | G06Q 10/107 709/206 |
| 2007/0168430 A1 | 7/2007 | Brun et al. | |
| 2010/0070589 A1 | 3/2010 | Shaw et al. | |
| 2011/0320373 A1 | 12/2011 | Lee et al. | |
| 2012/0102114 A1 | 4/2012 | Dunn et al. | |
| 2012/0166290 A1 | 6/2012 | Reis et al. | |
| 2012/0170721 A1 | 7/2012 | Yoakum | |
| 2012/0191585 A1* | 7/2012 | Lefebvre | G06Q 10/10 705/35 |
| 2012/0198002 A1 | 8/2012 | Goulart et al. | |
| 2012/0245925 A1 | 9/2012 | Guha et al. | |
| 2012/0278388 A1 | 11/2012 | Kleinbart et al. | |
| 2012/0323928 A1 | 12/2012 | Bhatia | |
| 2013/0073935 A1 | 3/2013 | Bertot et al. | |
| 2013/0212197 A1 | 8/2013 | Karlson | |
| 2013/0288722 A1 | 10/2013 | Ramanujam et al. | |
| 2014/0052797 A1 | 2/2014 | Lessard et al. | |
| 2014/0059141 A1 | 2/2014 | Belkin et al. | |
| 2014/0229571 A1 | 8/2014 | Buddenbaum et al. | |
| 2014/0244775 A1* | 8/2014 | Hull | H04L 51/26 709/207 |
| 2014/0270131 A1* | 9/2014 | Hand | H04M 3/42 379/208.01 |
| 2015/0026119 A1 | 1/2015 | Fischer et al. | |
| 2015/0039705 A1 | 2/2015 | Kursun | |
| 2016/0182430 A1* | 6/2016 | Sachidanandam | G06F 3/0482 715/752 |
| 2017/0054671 A1* | 2/2017 | Anderson | G06Q 10/10 |

OTHER PUBLICATIONS

IBM, "SPSS Text Analytics for Surveys," http://www-01.ibm.com/software/analytics/spss/products/statistics/text-analytics-for-surveys, 2014, pp. 1-3.

IBM, "IBM SPSS Statistics," http://www-01.ibm.com/software/analytics/spss/products/statistics, 2014, pp. 1-2.

Wikipedia, "Natural Language Processing," http://en.wikipedia.org/wiki/Natural_language_processing, 2014, pp. 1-10.

Antonio Calero, "Likes vs. Comments vs. Shares," http://www.antoniocalero.com/2013/05/06/facebook-likes-comments-shares, May 6, 2013, pp. 1-9.

Stack Overflow, "Vote Up," http://stackoverflow.com/help/privileges/vote-up, 2014, pp. 1-2.

Stack Overflow, "Vote Down," http://stackoverflow.com/help/privileges/vote-down, 2014, pp. 1-2.

* cited by examiner

PRIORITIZING MESSAGES IN AN ACTIVITY STREAM WITH AN ACTIONABLE ITEM OR EVENT FOR THE USER TO RESPOND

TECHNICAL FIELD

The present invention relates generally to social network services, and more particularly to prioritizing messages in an activity stream with an actionable item or event for the user to respond.

BACKGROUND

A social network service is an online service, platform or site that focuses on building social networks or social relations among people (e.g., those who share interests and/or activities). A social network service essentially consists of a representation of each user (often a profile), his/her social links, and a variety of additional services. Most social network services are web-based and provide means for users to interact over the Internet, such as by e-mail and instant messaging. Social networking sites allow users to share ideas, activities, events, and interests within their individual networks.

Social networking sites (e.g., Facebook®) present to a particular user the posts and stories by other users in a social networking feed or activity stream (may be referred to as a "news feed"). New postings or updates from friends and pages followed by the user (including photo tags, event updates, group memberships and other activity) will be reflected in the user's activity stream. Some of these posts and updates may require a response by the user. For example, the post of "Would you like to meet for coffee" requires a response from the user as to whether the user would like to meet with the sender of the message for coffee. However, the number of postings and updates can be overwhelming for the user to follow and respond thereby frustrating the user to determine which posts that require a response should be responded to first.

Currently, there is not currently a means for assisting the user to determine which posts to respond prior to other posts in the user's activity stream.

SUMMARY

In one embodiment of the present invention, a method for handling an overwhelming amount of messages in an activity stream comprises monitoring messages in the activity stream of a user. The method further comprises recording the monitored messages. The method additionally comprises identifying messages of the monitored messages in the activity stream of the user requiring a response to an actionable item or event, where the actionable item or event comprises an event, task, activity or action that needs to take place, and where deadlines, keywords, phrases or punctuation marks are identified in the monitored messages to indicate a required response to the actionable item or event. Furthermore, the method comprises prioritizing the identified messages with identified actionable items or events and placing the prioritized messages in a list based on the following factors: deadline, relationship of sender of message to the user, a desired social relationship by the user with sender of message and event schedule. Additionally, the method comprises displaying the list of prioritized messages on a user interface of a client device of the user. In addition, the method comprises prompting the user to respond to a message in the list of prioritized messages that has a highest rated priority.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for handling an overwhelming amount of messages in an activity stream. In one embodiment of the present invention, messages (e.g., posts) in an activity stream, such as an activity stream of a social networking system, of a user are monitored. Those monitored messages that contain an actionable item or event are identified. An actionable item or event, as used herein, refers to an event, task, activity, or action that needs to take place. For example, a user may receive a message from a boss requiring the user to provide a document at a meeting. The actionable item or event that needs to take place is the user providing a document at the meeting. The messages that contain an actionable item or event are prioritized and the prioritized messages are placed in a list based on one or more of the following factors: the deadline, the relationship of the sender of the message to the user, the user's desired social relationship with the sender of the message and the event schedule. For example, a message with a more impending deadline may have a higher priority than a message with a deadline of next week. In another example, a message from the user's boss may have a higher priority than a message from a high school friend. In a further example, a message from an individual with whom the user has a great desire to develop a social relationship, such as a girlfriend, may have a higher priority than a message from a friend who the user has not heard from in over three years. In another example, an event (e.g., attending the circus) that is imminent (e.g., tonight at 7 pm) may have a higher priority than an event (e.g., attending a baseball game on the $4^{th}$ of July when the current date is April $18^{th}$) that will not occur for many months in the distant future. The prioritized list is then displayed to the user. In this manner, the user will be able to handle the overwhelming amount of messages in an activity stream by determining which posts with an actionable item or event to respond prior to other posts in the user's activity stream.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
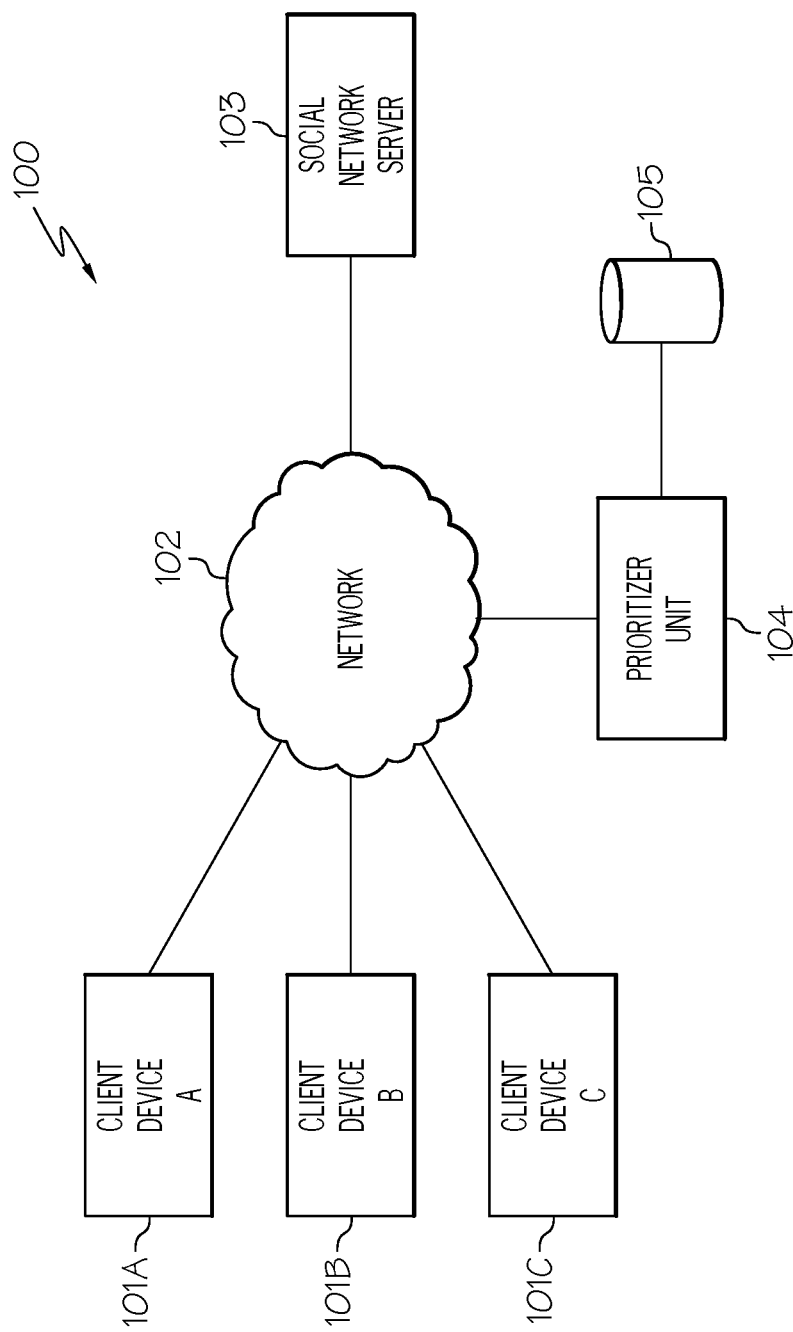
FIG. 1 illustrates a social network system configured in accordance with an embodiment of the present invention.

Referring now to the Figures in detail, FIG. 1 illustrates a social network system 100 configured in accordance with an embodiment of the present invention. Referring to FIG. 1, social network system 100 includes a community of users using client devices 101A-101C (identified as "Client Device A," "Client Device B," and "Client Device C," respectively, in FIG. 1) to be involved in social network system 100. Client devices 101A-101C may collectively or individually be referred to as client devices 101 or client device 101, respectively. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of client devices 101 to send and read other users' posts. "Posts," as used herein, include any one or more of the following: text (e.g., messages, comments, sub-comments and replies), audio, video images, etc. Social network server 103 is connected to network 102 by wire or wirelessly. While FIG. 1 illustrates a single social network server 103, it is noted for clarity that multiple servers may be used to implement the social networking and/or microblogging service.

System 100 further includes a prioritizer unit 104 connected to network 102 by wire or wirelessly. Prioritizer unit 104 is configured to prioritize messages in a user's activity stream (e.g., activity stream of the user of client device 101) with an actionable item or event that requires a response from the user as discussed in further detail below. An actionable item or event, as used herein, refers to an event, task, activity, or action that needs to take place. For example, a user may receive a message from a boss requiring the user to provide a document at a meeting. The actionable item or event that needs to take place is the user providing a document at the meeting. In another example, the user may receive a message from a friend requesting a time to meet for coffee. The actionable item or event is meeting for coffee. Such messages with actionable items or events require a response from the user. A description of the hardware configuration of prioritizer unit 104 is provided below in connection with FIG. 2.

System 100 additionally includes a database 105 connected to prioritizer unit 104 that stores the messages in the user's activity stream that are monitored and recorded by prioritizer unit 104. Furthermore, database 105 may be configured to store profiles of users (e.g., users of client devices 101). These profiles may include information pertaining to relationships (e.g., friend, boss) with various individuals (potential senders of messages) as well as how to prioritize messages from senders based on the relationship with that sender (e.g., colleague, friend, parent). For example, messages from a boss may have a higher priority than messages from a distant relative. In one embodiment, the profiles include an indication as to whether a message from a particular sender or a sender with a particular relationship (e.g., boss) with the user needs to be reposted (e.g., retweeted) in order to make sure that the user sees the message.

System 100 is not to be limited in scope to any one particular network architecture. System 100 may include any number of clients 101, networks 102, social network servers 103, prioritizer units 104 and databases 105. Furthermore, in one embodiment, prioritizer unit 104 may be part of client device 101 or social network server 103.

Figure 2:
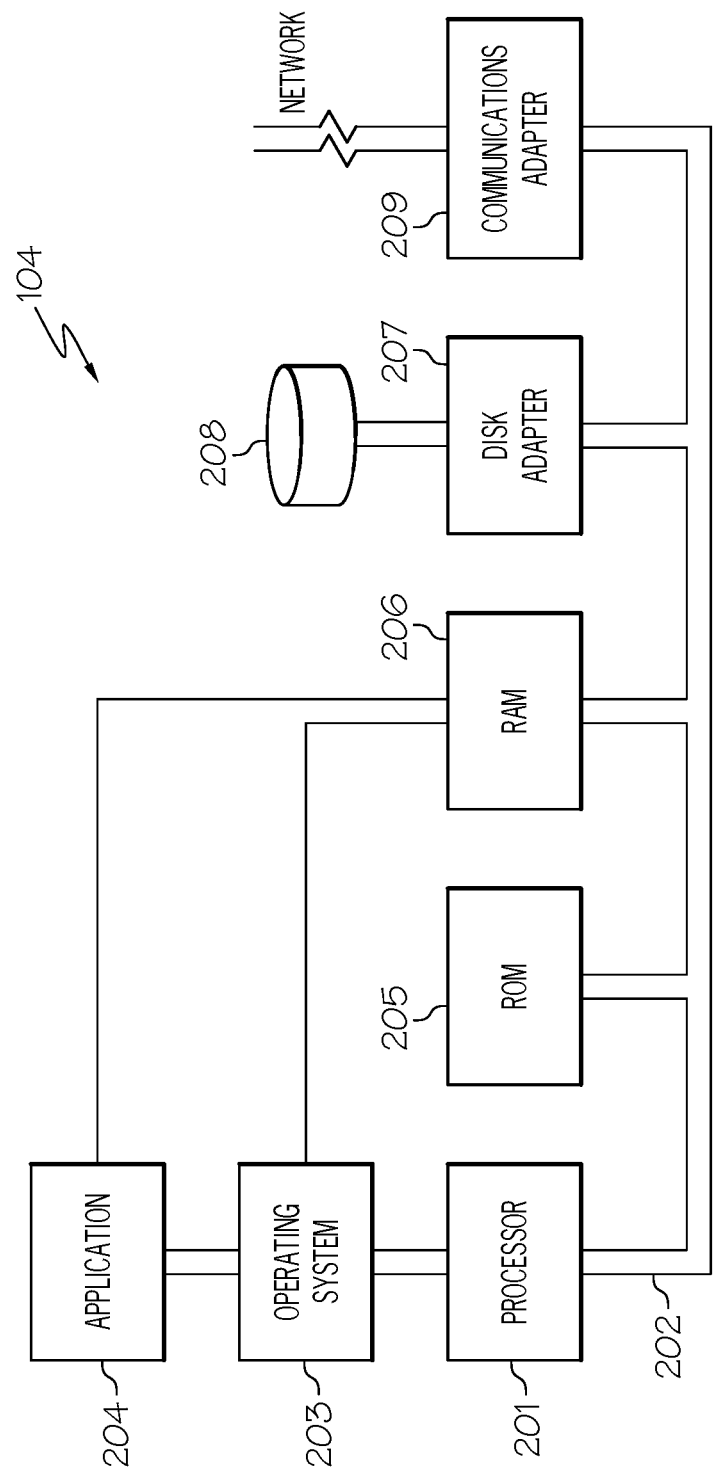
FIG. 2 illustrates a hardware configuration of a prioritizer unit configured in accordance with an embodiment of the present invention.

Referring now to FIG. 2, FIG. 2 illustrates a hardware configuration of prioritizer unit 104 (FIG. 1) which is representative of a hardware environment for practicing the present invention. Referring to FIG. 2, prioritizer unit 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for prioritizing messages (e.g., posts on a social networking system) in a user's activity stream that require a user response as discussed below in association with FIG. 3.

Referring again to FIG. 2, read-only memory ("ROM") 205 is coupled to system bus 202 and includes a basic input/output system ("BIOS") that controls certain basic functions of prioritizer unit 104. Random access memory ("RAM") 206 and disk adapter 207 are also coupled to system bus 202. It should be noted that software components including operating system 203 and application 204 may be loaded into RAM 206, which may be prioritizer unit's 104 main memory for execution. Disk adapter 207 may be an integrated drive electronics ("IDE") adapter that communicates with a disk unit 208, e.g., disk drive. It is noted that the program for prioritizing messages (e.g., posts on a social networking system) in a user's activity stream that require a user response, as discussed below in association with FIG. 3, may reside in disk unit 208 or in application 204.

Prioritizer unit 104 may further include a communications adapter 209 coupled to bus 202. Communications adapter 209 interconnects bus 202 with an outside network (e.g., network 102 of FIG. 1) thereby allowing prioritizer unit 104 to communicate with client devices 101 and social network server 103.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, social networking sites (e.g., Facebook®) present to a particular user the posts and stories by other users in a social networking feed or activity stream (may be referred to as a "news feed"). New postings or updates from friends and pages followed by the user (including photo tags, event updates, group memberships and other activity) will be reflected in the user's activity stream. Some of these posts and updates may require a response by the user. For example, the post of "Would you like to meet for coffee" requires a response from the user as to whether the user would like to meet with the sender of the message for coffee. However, the number of postings and updates can be overwhelming for the user to follow and respond thereby frustrating the user to determine which posts that require a response should be responded to first. Currently, there is not currently a means for assisting the user to determine which posts to respond prior to other posts in the user's activity stream.

The principles of the present invention provide a means for prioritizing messages in a user's activity stream with an actionable item or event to assist the user in responding to the higher prioritized messages prior to the lower prioritized messages as discussed below in connection with FIG. 3.

Figure 3:
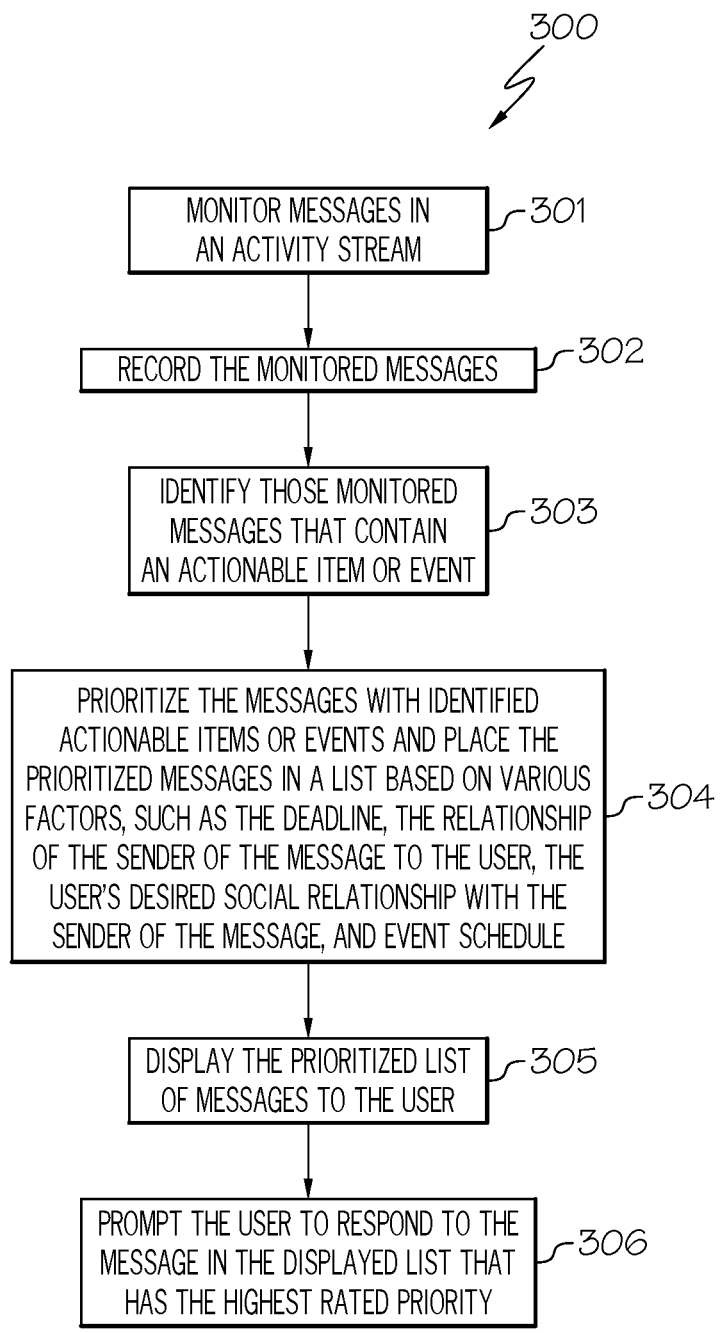
FIG. 3 is a flowchart of a method for prioritizing messages in a user's activity stream that require a response from the user in accordance with an embodiment of the present invention.

FIG. 3 is a flowchart of a method 300 for prioritizing messages (e.g., posts on a social networking system) in a user's activity stream that require a user response in accordance with an embodiment of the present invention.

Referring to FIG. 3, in conjunction with FIGS. 1-2, in step 301, prioritizer unit 104 monitors messages (e.g., posts) in an activity stream, such as an activity stream of a social networking system, of a user (e.g., user of client device 101A).

In step 302, prioritizer unit 104 records the monitored messages, such as in database 105.

In step 303, prioritizer unit 104 identifies those monitored messages that contain an actionable item or event. An actionable item or event, as used herein, refers to an event, task, activity, or action that needs to take place. For example, a user may receive a message from a boss requiring the user to provide a document at a meeting. The actionable item or event that needs to take place is the user providing a document at the meeting. In another example, the user may receive a message from a friend requesting a time to meet for coffee. The actionable item or event is meeting for coffee.

In one embodiment, actionable items or events in the monitored messages are identified using natural language processing. For example, deadlines, particular keywords or phrases or punctuation marks (e.g., question mark) may be identified in the messages to indicate a required response to an actionable item or event by the user. For example, prioritizer unit 104 identifies an actionable item or event based on identifying a question mark in the message "Hi Alice, how was your new year?" thereby indicating that a response is required, such as to "how was your new year?" In another example, prioritizer unit 104 identifies an actionable item or event in a message based on identifying the phrase "tomorrow morning" in the message "Hi Alice, let's meet for coffee tomorrow morning," to indicate a required response as to whether Alice will meet the sender of the message for coffee tomorrow. In a further example, prioritizer unit 104 identifies an actionable item or event in a message by identifying a deadline (e.g., "10 am") in the message "Hi Alice, could you please e-mail me the documents first thing tomorrow morning before our 10 am meeting?" thereby indicating that a response is required to e-mail the documents before the 10 am meeting. In another example, an actionable item or event to respond may be identified based on identifying an action performed by the sender of the message in response to a prior request by the user. For example, the user may have previously requested an individual to perform an action, such as providing details for a presentation to be performed by the user. In the message "Hi Alice, I e-mailed you the details you asked for to add to your presentation tomorrow morning at 10 am," the prioritizer unit 104 may identify the message as containing an actionable item or event based on the sender of the message performing a previous task requested by the user and the timing of "tomorrow morning" and "10 am."

In step 304, prioritizer unit 104 prioritizes the messages with identified actionable items or events and places the prioritized messages in a list based on various factors, such as the deadline, the relationship of the sender of the message to the user (e.g., friend, boss, parent), the user's desired social relationship with the sender of the message, and event schedule. For example, a message with a more impending deadline may have a higher priority than a message with a deadline of next week.

In another example, a message from the user's boss may have a higher priority than a message from a high school friend. In one embodiment, the relationship between the sender of the message and the user may be determined using social media, such as the user's social media homepage or a business social media website (e.g., LinkedIn®). For example, if the sender is listed on the user's social media homepage as a friend of the user, then it may be inferred by prioritizer unit 104 that the sender of the message is a friend of the user. In another example, if the sender of the message is listed as a supervisor at a company that the user works on a business social media website and the user is not in a management position, then it may be inferred by prioritizer unit 104 that the sender of the message is a boss of the user.

In a further example, a message from an individual, such as a girlfriend, with whom the user has a great desire to develop a social relationship or strengthen the social relationship, may have a higher priority than a message from a friend who the user has not heard from in over three years. In one embodiment, prioritizer unit 104 may identify the desired social relationship with a sender based on the user's profile that contains information about the user's desired social relationships with various individuals entered by the user. For example, the user may indicate that all messages from a particular girl are to have a high priority as the user has a great desire to develop a social relationship with that individual. In another example, the user may indicate that any messages from another individual are to have a low priority as the user does not want to develop a social relationship with that individual. Prioritizer unit 104 may determine if the sender of a message matches any of these individuals based on matching the sender's name with one of the individuals listed in the user's profile. In one embodiment, prioritizer unit 104 may determine the desired social relationship with the sender of the message based on social media. For example, if the sender is listed as one of the user's friends on the user's social media homepage, then such a message may be deemed to have a higher priority than a message from a sender who is not listed as one of the user's friends on the user's social media homepage.

Furthermore, a message with an identified actionable item or event may be prioritized based on the event schedule, such as an event (e.g., attending the circus) that is imminent (e.g., tonight at 7 pm) in comparison to an event (e.g., attending a baseball game on the $4^{th}$ of July when the current date is April $18^{th}$) that will not occur for many months in the distant future.

The principles of the present invention are not to be limited in scope to the exemplary factors used to prioritize messages with actionable items or events as discussed above. The principles of the present invention may apply any factor that may be used to determine which messages with actionable items or events are deemed to have a higher priority than other messages from the perspective of the user. A person of ordinary skill in the art would be capable of applying the principles of the present invention to such implementations. Further, embodiments applying the principles of the present invention to such implementations would fall within the scope of the present invention.

An example of prioritizer unit 104 prioritizing messages identified as containing actionable items or events is described below.

An example of the user's activity stream containing the following messages from the indicated senders with the most recent on top is shown below:

Bob: Hi Alice, how was your new year?

Charlie: Hi Alice, let's meet for coffee tomorrow morning.

David (Alice's boss): Hi Alice, could you please e-mail me the documents first thing tomorrow morning before our 10 am meeting.

Edward (Alice's colleague): Hi Alice, I e-mailed you the details you asked for to add to your presentation tomorrow morning at 10 am.

Prioritizer unit 104 identifies the following actionable items and actions based on these messages: question regarding your new year, meet for coffee, e-mail documents first thing tomorrow morning at 10 am, and details you asked for to add to your presentation tomorrow morning at 10 am.

Prioritizer unit 104 may then prioritize these messages with actionable items or actions based on the factors discussed above as follows:

Edward (Alice's colleague): Hi Alice, I e-mailed you the details you asked for to add to your presentation tomorrow morning at 10 am.

David (Alice's boss): Hi Alice, could you please e-mail me the documents first thing tomorrow morning before our 10 am meeting.

Charlie: Hi Alice, let's meet for coffee tomorrow morning.

Bob: Hi Alice, how was your new year?

The message from Edward has the highest priority since it involves details that Alice needs regarding the presentation that occurs in the near term (tomorrow morning at 10 am) which may be needed by Alice in order to respond to the message from David and the message is from a colleague of Alice. Also, Alice may have indicated (either directly or indirectly, such as via social media) a great desire to develop a social relationship or strengthen the social relationship with Edward. The message from David is rated as the second highest priority since the message is from Alice's boss and it is regarding e-mailing documents prior to the meeting to occur in the near term (e.g., tomorrow morning at 10 am). The message from Charlie is rated the next highest since it is regarding meeting for coffee and the message from Bob is rated the lowest since it is asking how was the user's new year which is not an urgent message and Bob may simply be a friend who infrequently communicates with the user.

In step 305, prioritizer unit 104 displays the prioritized list of messages to the user, such as on the user interface of the user's client device 101. For example, such a prioritized list may be displayed to the user after the user logs onto client device 101. In this manner, the user will be able to handle the overwhelming amount of messages in an activity stream by determining which posts with an actionable item or event to respond prior to other posts in the user's activity stream.

In one embodiment, the prioritized list of messages may be displayed in a separate view for the user so that the user can view the messages with actionable items and actions separately from other messages. In one embodiment, the prioritized list of messages displayed in the separate view only contains the most urgent messages that the user needs to respond.

In step 306, prioritizer unit 104 prompts the user to respond to the message in the displayed list that has the highest rated priority. Prioritizer unit 104 may prompt the user using various means, such as via e-mail, text message, etc.

While the foregoing discusses the present invention in connection with prioritizing messages for a single user, the principles of the present invention may be used to prioritize messages for multiple people.

The present invention may also include the aspect of rewarding the user based on the number of messages that are prioritized. A person of ordinary skill in the art would be capable of applying the principles of the present invention to such implementations. Further, embodiments applying the principles of the present invention to such implementations would fall within the scope of the present invention.

Furthermore, the present invention may also automatically repost (e.g., retweet) messages, such as the message rated the highest priority, based on a prior agreement as indicated in the user's profile. For example, the user may indicate in the user's profile that messages from the user's boss need to be reposted to make sure that the user sees the message. A person of ordinary skill in the art would be capable of applying the principles of the present invention to such implementations. Further, embodiments applying the principles of the present invention to such implementations would fall within the scope of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for handling an overwhelming amount of messages in an activity stream, the method comprising:
    monitoring messages in said activity stream of a user;
    recording said monitored messages;
    identifying messages of said monitored messages in said activity stream of said user requiring a response to an actionable item or event, wherein said actionable item or event comprises an event, task, activity or action that needs to take place, wherein deadlines, keywords, phrases or punctuation marks are identified in said monitored messages to indicate a required response to said actionable item or event;
    prioritizing said identified messages with identified actionable items or events and placing said prioritized messages in a list based on the following factors: deadline, relationship of sender of message to said user, a desired social relationship by said user with sender of message and event schedule;
    displaying a subset of said prioritized messages in said list of prioritized messages on a user interface of a client device of said user in a separate view for said user so that said user can view said subset of said prioritized messages in said list of prioritized messages separately from other messages; and
    reposting a message in said list of prioritized messages based on a prior agreement as indicated in a profile of said user, wherein said user profile indicates that messages from a sender who has a particular type of relationship with said user are to be reposted.

2. The method as recited in claim 1, wherein said list of prioritized messages is displayed on said user interface of said client device of said user after said user logs onto said client device.

3. The method as recited in claim 1 further comprising:
displaying said subset of said prioritized messages from said list of prioritized messages that are most urgent for said user to respond in said separate view so that said user can view said subset of prioritized messages from said list of said prioritized messages separately from other messages.

4. The method as recited in claim 1 further comprising:
reposting said message rated a highest priority based on said prior agreement as indicated in said profile of said user.

5. The method as recited in claim 1 further comprising:
rewarding said user based on a number of said prioritized messages.

6. The method as recited in claim 1, wherein said user's desired social relationship with said sender of said message is determined using a profile of said user or social media.

7. The method as recited in claim 1, wherein said user is prompted using one of the following: e-mail and text message.

8. A computer program product for handling an overwhelming amount of messages in an activity stream, the computer program product comprising a computer readable storage medium having program code embodied therewith, the program code comprising the programming instructions for:
monitoring messages in said activity stream of a user;
recording said monitored messages;
identifying messages of said monitored messages in said activity stream of said user requiring a response to an actionable item or event, wherein said actionable item or event comprises an event, task, activity or action that needs to take place, wherein deadlines, keywords, phrases or punctuation marks are identified in said monitored messages to indicate a required response to said actionable item or event;
prioritizing said identified messages with identified actionable items or events and placing said prioritized messages in a list based on the following factors: deadline, relationship of sender of message to said user, a desired social relationship by said user with sender of message and event schedule;
displaying a subset of said prioritized messages in said list of prioritized messages on a user interface of a client device of said user in a separate view for said user so that said user can view said subset of said prioritized messages in said list of prioritized messages separately from other messages; and
reposting a message in said list of prioritized messages based on a prior agreement as indicated in a profile of said user, wherein said user profile indicates that messages from a sender who has a particular type of relationship with said user are to be reposted.

9. The computer program product as recited in claim 8, wherein said list of prioritized messages is displayed on said user interface of said client device of said user after said user logs onto said client device.

10. The computer program product as recited in claim 8, wherein the program code further comprises the programming instructions for:
displaying said subset of said prioritized messages from said list of prioritized messages that are most urgent for said user to respond in said separate view so that said user can view said subset of prioritized messages from said list of said prioritized messages separately from other messages.

11. The computer program product as recited in claim 8, wherein the program code further comprises the programming instructions for:
reposting said message rated a highest priority based on said prior agreement as indicated in said profile of said user.

12. The computer program product as recited in claim 8, wherein the program code further comprises the programming instructions for:
rewarding said user based on a number of said prioritized messages.

13. The computer program product as recited in claim 8, wherein said user's desired social relationship with said sender of said message is determined using a profile of said user or social media.

14. The computer program product as recited in claim 8, wherein said user is prompted using one of the following: e-mail and text message.

15. A system, comprising:
a memory for storing a computer program for handling an overwhelming amount of messages in an activity stream; and
a processor connected to said memory, wherein said processor is configured to execute the program instructions of the computer program comprising:
monitoring messages in said activity stream of a user;
recording said monitored messages;
identifying messages of said monitored messages in said activity stream of said user requiring a response to an actionable item or event, wherein said actionable item or event comprises an event, task, activity or action that needs to take place, wherein deadlines, keywords, phrases or punctuation marks are identified in said monitored messages to indicate a required response to said actionable item or event;
prioritizing said identified messages with identified actionable items or events and placing said prioritized messages in a list based on the following factors: deadline, relationship of sender of message to said user, a desired social relationship by said user with sender of message and event schedule;
displaying a subset of said prioritized messages in said list of prioritized messages on a user interface of a client device of said user in a separate view for said user so that said user can view said subset of said prioritized messages in said list of prioritized messages separately from other messages; and
reposting a message in said list of prioritized messages based on a prior agreement as indicated in a profile of said user, wherein said user profile indicates that messages from a sender who has a particular type of relationship with said user are to be reposted.

16. The system as recited in claim 15, wherein said list of prioritized messages is displayed on said user interface of said client device of said user after said user logs onto said client device.

17. The system as recited in claim 15, wherein the program instructions of the computer program further comprise:
displaying said subset of said prioritized messages from said list of prioritized messages that are most urgent for said user to respond in said separate view so that said user can view said subset of prioritized messages from said list of said prioritized messages separately from other messages.

18. The system as recited in claim 15, wherein the program instructions of the computer program further comprise:
reposting said message rated a highest priority based on said prior agreement as indicated in said profile of said user.

19. The system as recited in claim 15, wherein the program instructions of the computer program further comprise:
rewarding said user based on a number of said prioritized messages.

20. The system as recited in claim 15, wherein said user's desired social relationship with said sender of said message is determined using a profile of said user or social media.

* * * * *